United States Patent
Zhang et al.

(10) Patent No.: US 11,881,942 B2
(45) Date of Patent: Jan. 23, 2024

(54) TRANSPORT BLOCK SIZE DETERMINATION FOR PHYSICAL SHARED CHANNEL

(71) Applicant: Apple Inc., Cupertino, CA (US)

(72) Inventors: Yushu Zhang, Beijing (CN); Weidong Yang, San Diego, CA (US); Haitong Sun, Cupertino, CA (US); Chunhai Yao, Beijing (CN); Ruoheng Liu, San Diego, CA (US); Jia Tang, San Jose, CA (US); Kaushik Josiam, Escondido, CA (US); Wei Zhang, Saratoga, CA (US); Hong He, San Jose, CA (US); Chunxuan Ye, San Diego, CA (US); Wei Zeng, Saratoga, CA (US); Dawei Zhang, Saratoga, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,980

(22) PCT Filed: Apr. 8, 2020

(86) PCT No.: PCT/CN2020/083761
§ 371 (c)(1),
(2) Date: Sep. 20, 2021

(87) PCT Pub. No.: WO2021/203297
PCT Pub. Date: Oct. 14, 2021

(65) Prior Publication Data
US 2023/0024437 A1   Jan. 26, 2023

(51) Int. Cl.
*H04L 1/00*   (2006.01)
*H04W 72/12*   (2023.01)
(Continued)

(52) U.S. Cl.
CPC ....... *H04L 1/0007* (2013.01); *H04W 72/1263* (2013.01); *H04W 76/20* (2018.02)

(58) Field of Classification Search
CPC ... H04L 1/0007; H04L 5/0044; H04L 5/0094; H04W 72/1263; H04W 72/12; H04W 76/20
(Continued)

(56) References Cited

U.S. PATENT DOCUMENTS

2017/0311326 A1* 10/2017 Wong ................... H04W 72/23
2017/0338915 A1   11/2017 Kim et al.
(Continued)

FOREIGN PATENT DOCUMENTS

CN         110611549 A        12/2019

OTHER PUBLICATIONS

PCT Search Report dated Dec. 17, 2020 in connection with PCT Application No. PCT/CN2020/083761.
(Continued)

*Primary Examiner* — Candal Elpenord
(74) *Attorney, Agent, or Firm* — Eschweiler & Potashnik, LLC

(57) ABSTRACT

A network device (e.g., a user equipment (UE), a new radio NB (gNB), or other network component) can process or generate a physical shared channel based on a number of resource blocks determined by one or more formulas for a transport block size (TBS). In response to determining a result of the one or more formulas based on one or more received parameters a configured action for the physical shared channel can be determined based on the number of resource elements (REs). A radio frequency (RF) interface, is configured to provide, to RF circuitry, data for transmitting a new radio (NR) communication based on the configured action.

19 Claims, 9 Drawing Sheets

(51) Int. Cl.
*H04W 76/20* (2018.01)
*H04W 72/1263* (2023.01)

(58) Field of Classification Search
USPC .................................................. 370/329–330
See application file for complete search history.

(56) References Cited

U.S. PATENT DOCUMENTS

| | | | |
|---|---|---|---|
| 2019/0045390 A1* | 2/2019 | Davydov | H04W 28/0289 |
| 2019/0150183 A1* | 5/2019 | Aiba | H04W 24/10 370/336 |
| 2021/0144715 A1* | 5/2021 | Gotoh | H04L 1/0004 |
| 2022/0201711 A1* | 6/2022 | Lee | H04W 72/20 |
| 2022/0279551 A1* | 9/2022 | Liu | H04W 72/0446 |
| 2023/0079557 A1* | 3/2023 | Guo | H04L 69/24 |

OTHER PUBLICATIONS

3GPP 3rd Generation Partnership Project; "Technical Specification Group Radio Access Network"; NR; Physical layer procedures for data (release16); 3GPP TS 38.214 V16.1.0; Mar. 31, 2020.
LG Electronics; "Discussion on physical layer structure for NR sidelink"; 3GPP TSG RAN WGI; Meeting #100 R1-2000781; Mar. 6, 2020.
PCT Search Report and Written Opinion dated Dec. 17, 2020 in connection with PCT Application No. PCT/CN2020/083761.
Japanese Office Action, dated Jul. 18, 2023, in connection with Japanese Patent Application No. 2022-561069.
Nokia, Nokia Shanghai Bell; 7.2.5.1; Maintenance of Rel-16 URLLC PDCCH enhancements; Discussion and Decision; R1-2000432; 3GPP TSG RAN WG1 Meeting #100; e-Meeting, Feb. 24-Mar. 6, 2020.

* cited by examiner

Information Element: PDSCH-ServingCellConfig

```
PDSCH-ServingCellConfig ::= SEQUENCE {
    codeBlockGroupTransmission SetupRelease { PDSCH-CodeBlockGroupTransmission
    } OPTIONAL, -- Need M
    xOverhead ENUMERATED { xOh6, xOh12, xOh18 } OPTIONAL, -- Need S
    nrofHARQ-ProcessesForPDSCH ENUMERATED {n2, n4, n6, n10, n12, n16}
    OPTIONAL, -- Need S
    pucch-Cell ServCellIndex OPTIONAL, -- Cond SCellAddOnly
    ...,
    [[
    maxMIMO-Layers INTEGER (1..8) OPTIONAL, -- Need M
    processingType2Enabled BOOLEANOPTIONAL-- Need M
    ]]
}
```

*FIG. 9* ial Patent Application No. PCT/CN2020/083761
TRANSPORT BLOCK SIZE DETERMINATION FOR PHYSICAL SHARED CHANNEL

REFERENCE TO RELATED APPLICATIONS

This application is a National Phase entry application of International Patent Application No. PCT/CN2020/083761 filed Apr. 8, 2020, entitled "TRANSPORT BLOCK SIZE DETERMINATION FOR PUSCH", the contents of which are herein incorporated by reference in their entirety.

FIELD

The present disclosure relates to wireless technology and more specifically to transport block size determination for a physical shared channel.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that seeks to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to provide lives with better, simple and seamless wireless connectivity solutions. NR will enable everything to be connected by wireless and deliver fast, rich contents and services.

Recently, the first release on NR (5G) specification provided a baseline set of features and components for future cellular communication systems. It also supports the aspects of ultra-reliable low latency communication (URLLC) by means of flexible resources allocation, scheduling & hybrid automatic repeat request (HARQ), low spectrum efficiency transmission parameters, etc. In Release 16, the baseline URLLC functionality is needs to be enhanced, where one of the design directions is to further improve behavior with respect to supporting determinations for a transport block size (TBS).

BRIEF DESCRIPTION OF THE DRAWINGS

FIG. 9 is an example information element for configuring various embodiments on logical channel according to various aspects described herein.

DETAILED DESCRIPTION

Figure 1:
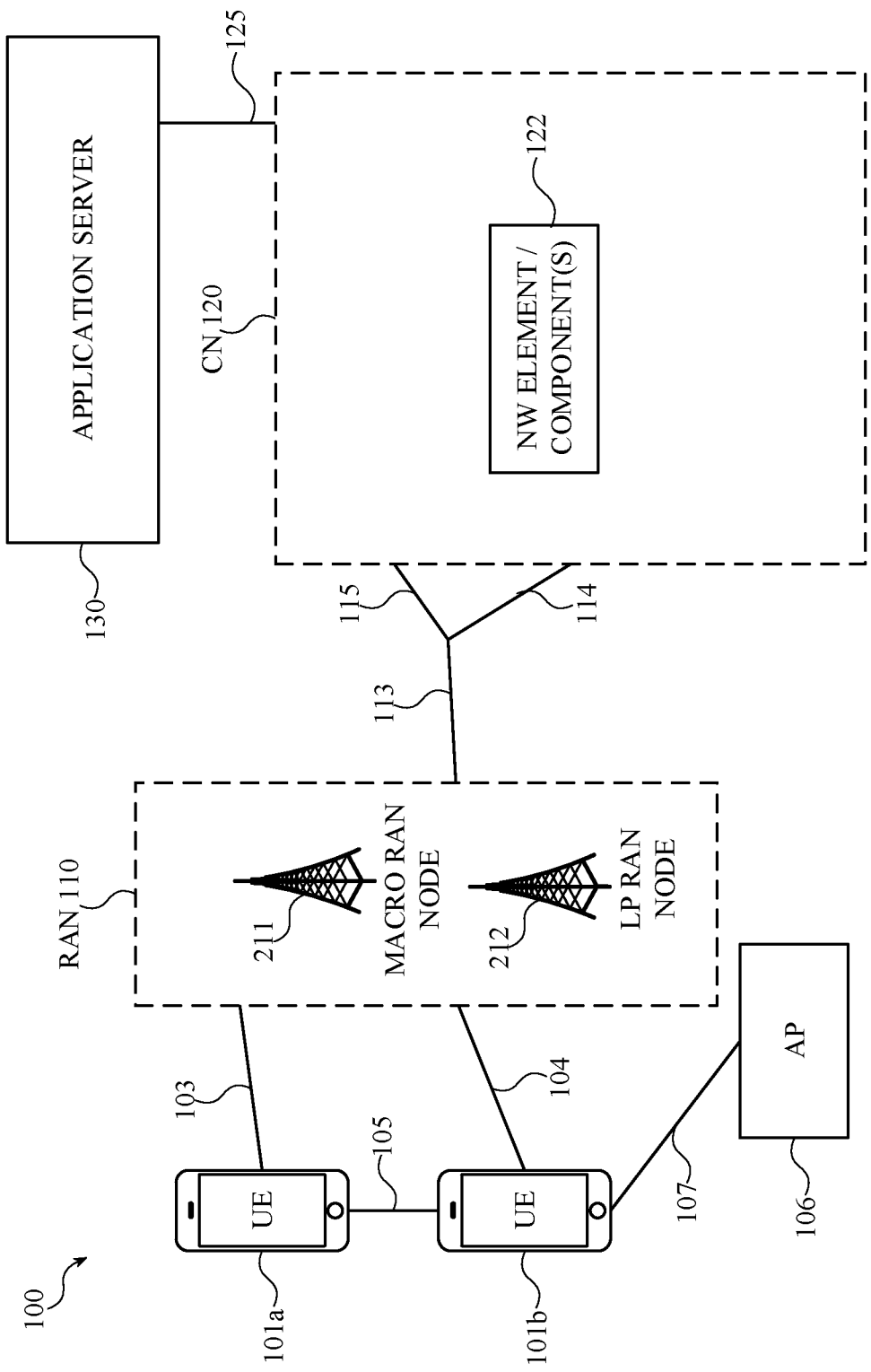
FIG. 1 is an example block diagram illustrating an example of user equipment(s) (UEs) and next generation NodeBs (gNBs) or access nodes in a network with network components useable in connection with various aspects (embodiments) described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various concerns for the transport block size (TBS) for physical shared channels (e.g., physical uplink shared channel (PUSCH) or physical downlink shared channel (PDSCH)) various embodiments can ensure that smaller transmissions, especially with regard to the so-called orphan symbol problem is under discussion, can be accommodated for. These embodiments can be advantageous for ultra-reliable low-latency communication, as well as any physical shared channel. Briefly, due to segmentation, some actual transmissions could consist of one or a few symbols. These symbols could be perceived to not carry useful information, and not conform to transmissions that could have been triggered by dynamic signaling. Due to these issues, special handling could be facilitated to support such transmissions by the user equipment (UE). Hence, it could be envisioned that orphan symbols, for example, lack support in the 3GPP specification, nevertheless the UE behavior concerning orphan symbols could be further clarified.

Additional issues related to the so-called orphan symbol can also be addressed. More specifically, similar conditions as the orphan symbol issue can be encountered in ultra-reliable low-latency communication (URLLC), the determined transport block size (TBS) can be zero. In one embodiment, if the transport block size is zero, then the physical uplink shared channel (PUSCH) transmission, a physical downlink shared channel (PDSCH), or other such communication can be dropped. In other embodiments, the overhead incurred by that specific PUSCH may not be as large as the RRC-configured overhead, then adjustment to the transport block size calculation formula can be considered and configured by a configured action to take. This can result in a positive value for the number of Resource Elements (REs) to be configured in the TBS. Additional aspects and details of the disclosure are further described below with reference to figures.

Embodiments described herein can be implemented into a system or network device using any suitably configured hardware and/or software. FIG. 1 illustrates an architecture of a system 100 of a network in accordance with some embodiments. The system 100 is illustrated to include a UE 101*a* and a UE 101*b*, which can further represent new radio (NR) devices (e.g., a UE or gNB) or the like as discussed herein.

FIG. 1 illustrates an example architecture of a system 100 of a network, in accordance with various embodiments. The following description is provided for an example system 100 that operates in conjunction with the LTE system standards and 5G or NR system standards as provided by 2GPP technical specifications. However, the example embodiments are not limited in this regard and the described embodiments can apply to other networks that benefit from the principles described herein, such as future 2GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but can also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface or layer (discussed in further detail below).

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 2GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (ANs) or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally, or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

In V2X scenarios one or more of the RAN nodes 111 can be or act as RSUs. The term "Road Side Unit" or "RSU" can refer to any transportation infrastructure entity used for V2X communications. An RSU can be implemented in or by a suitable RAN node or a stationary (or relatively stationary) UE, where an RSU implemented in or by a UE can be referred to as a "UE-type RSU," an RSU implemented in or by an eNB can be referred to as an "eNB-type RSU," an RSU implemented in or by a gNB can be referred to as a "gNB-type RSU," and the like. In one example, an RSU is a computing device coupled with radio frequency circuitry located on a roadside that provides connectivity support to passing vehicle UEs 101 (vUEs 101). The RSU can also include internal data storage circuitry to store intersection map geometry, traffic statistics, media, as well as applications/software to sense and control ongoing vehicular and pedestrian traffic. The RSU can operate on the 5.9 GHz DSRC band to provide very low latency communications required for high speed events, such as crash avoidance, traffic warnings, and the like. Additionally, or alternatively, the RSU can operate on the cellular V2X band to provide the aforementioned low latency communications, as well as other cellular communications services. Additionally, or alternatively, the RSU can operate as a Wi-Fi hotspot (2.4 GHz band) and/or provide connectivity to one or more cellular networks to provide uplink and downlink communications. The computing device(s) and some or all of the radiofrequency circuitry of the RSU can be packaged in a weatherproof enclosure suitable for outdoor installation, and can include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (μs); however, the size of the CWS and a maximum channel occupancy time (MOOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). A CC can have a bandwidth of 1.4, 2, 5, 10, 15 or 20 MHz and a maximum of about five CCs or otherwise can be aggregated, and therefore, a maximum aggregated bandwidth can be about 100 MHz, for example. In frequency division duplex (FDD) systems, the number of aggregated carriers can be different for DL and UL, where the number of UL CCs is equal to or lower than the number of DL component carriers. In some cases, individual CCs can have a different bandwidth than other CCs. In time division duplex (TDD) systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 111 can be configured to communicate with one another via interface 112. In embodiments where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC (referred to as "5GC 120" or the like), and the RAN 110 can be connected with the CN 120 via an NG interface 112. In embodiments, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an EPC). Where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
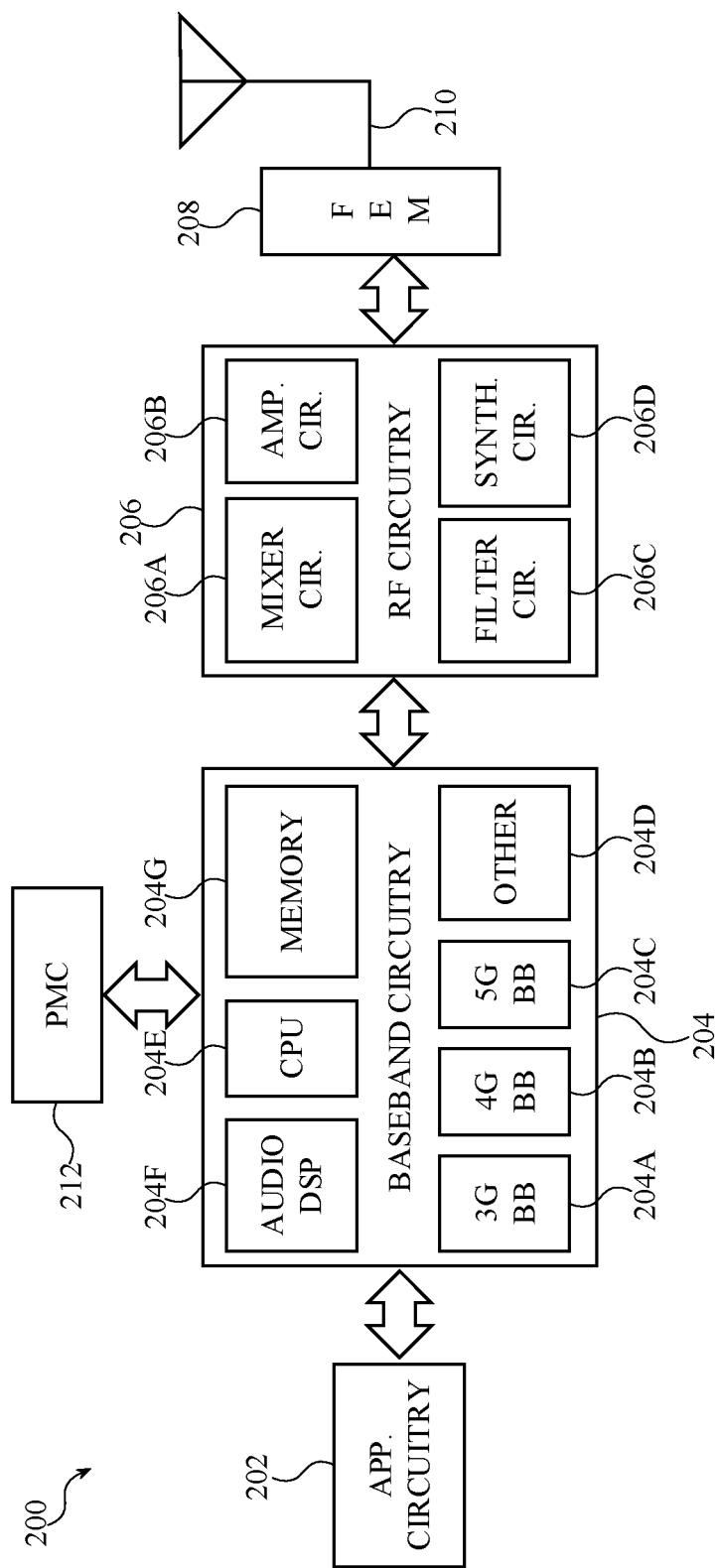
FIG. 2 is another example block diagram illustrating a system employable at a UE or gNB, according to various aspects described herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101a/101b, or eNB/gNB 111a/111b. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.).

The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low-Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
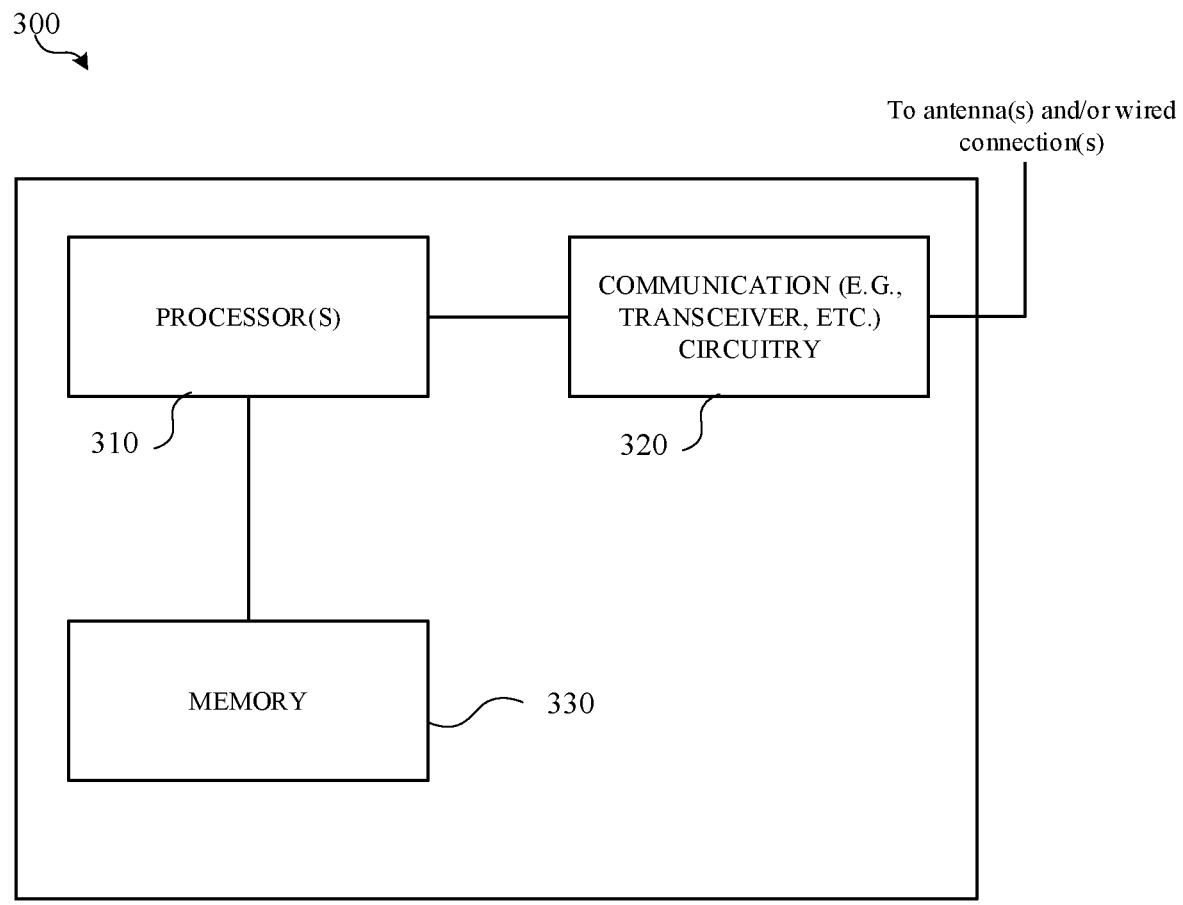
FIG. 3 is an exemplary simplified block diagram of a UE wireless communication device or other network device/component (e.g., gNB) in accordance with various aspects described.

Referring to FIG. 3, illustrated is a block diagram of a user equipment wireless communication device (UE) or other network device/component (e.g., gNB, eNB, or other participating entity). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

In various embodiments (aspects) discussed herein, signals or messages can be generated and output for transmission, and/or transmitted messages can be received and processed. Depending on the type of signal or message generated, outputting for transmission (e.g., by processor(s) 310, processor(s) 310, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 310) can comprise one or more of: identifying physical resources associated with the signal/message, detecting the signal/message, resource element group de-interleaving, demodulation, descrambling, and/or decoding.

According to various embodiments, various types of PUSCH can be performed in two ways: Type A, as slot-based repetitions, i.e. the same time domain allocation can be used in repeated slots, in particular the starting symbol, duration of PUSCH, and PUSCH mapping type in each slot in an aggregation are the same and derived from the time domain resource allocation field of the DCI scheduling PUSCH or activating Type 2 configured grant (CG)-PUSCH; Type B, as back-to-back repetitions (or mini-, miniscule repetitions), i.e. the starting symbol of repetitions other than initial one is derived based on ending symbol of the previous repetition or based on other rule/indication so that repetitions can even be performed within one slot or with minimum/no gap in different slots.

Basically, type B can be a mechanism of repeating the time domain resource allocation on a back-to-back (or contiguous) basis, instead of on a slot basis, so that the time domain resource allocation gives a starting symbol and duration of the initial transmission and repeated starting from the next available symbol (e.g., symbol 0 in slot n+1 with repetition, in the next slot, or within a slot in other examples), even it may be done in the same slot, so that the duration is given by the duration of the initial transmission; however, the starting symbol of repetition is given by looking for the next available symbol of the previous repetition. Thus, type B can be different from the type A repetition.

In one embodiment, a transport block size (TBS) determination can be configured by the UE 101, 200 or 300 through the procedure found in Appendix of technical specification (TS) 38.214). A key parameter that can be utilized can be a number $N'_{RE}$ of REs available for transmission. In particular, a representation for the number $N'_{RE}$ of REs available for PUSCH transmission can be as follows: $N'_{RE} = N_{sc}^{RB} \cdot N_{symb}^{sh} - N_{DMRS}^{PRB} - N_{oh}^{PRB}$ where $N'_{RE}$ is the number of REs available for PUSCH transmission within a physical resource block (PRB), where $N_{sc}^{RB}$ is a number of subcarriers in the frequency domain in a physical resource block, where $N_{symb}^{sh}$ is a number of symbols of a physical shared channel within a slot, where $N_{oh}^{PRB}$ is an overhead parameter configured by a higher layer signaling based on a serving cell configuration of an information element to different signal durations of a PUSCH transmission or a PDSCH transmission as the physical shared channel, and where $N_{DMRS}^{PRB}$ is a number of REs for demodulation reference signal (DMRS) per physical resource block (PRB) in an allocated duration including an overhead of the DM-RS code division multiplexing (CDM) groups without data. The first term $N_{SC}^{RB} \cdot N_{symb}^{sh}$ provides a total number of REs in a PRB with a PUSCH allocation of $N_{symb}^{sh}$ symbols. The parameter $N_{oh}^{PRB}$ can be the overhead configured by higher layer parameter xOverhead in PUSCH-ServingCellConfig, which can take a value from 0, 6, 12, 18. For PDSCH, the parameter $N_{oh}^{PRB}$ can be the overhead configured by higher layer parameter xOverhead in PDSCH-ServingCellConfig, which can take a value from 0, 6, 12, 18.

The UE 101, 200 or 300 can be configured to first determine the available REs in a single PRB, or to calculate the number of REs available for PRB transmission. By the formula $N'_{RE} = N_{sc}^{RB} \cdot N_{symb}^{sh} - N_{DMRS}^{PRB} - N_{oh}^{PRB}$, for example, the $N_{sc}^{RB}$ can be 12, which can be a fixed 12 and not subject to change. This is a number of tones in one PRB in NR transmission. The $N_{symb}^{sh}$ can be two symbols, for example, but changed dynamically as indicated, such ask by RRC or higher layer signaling. The third term is the $N_{DMRS}^{PRB}$ as a number of DMRS, or the DMRS overhead, which can be 6, for example. DMRS can be either Configuration Type 1 or Configuration Type 2. For Configuration Type 1, for example, a consecutive structure is enabled, and for example, in this a configuration example Configuration Type 1 for DMRS the $N_{DMRS}^{PRB}$, can be 6. The $N_{oh}^{PRB}$ can be 18 REs as overhead for other resources as a fixed RRC configured configuration and cannot change with dynamic signaling.

A normal transmission can be anything from one symbol to 14 symbols. Thus, then the overhead could just be too much in a particular case, where in this case only two symbols are to be transmitted, but in other cases more. This can be a problem where due to the overhead being RRC configured and not subject to change in a transmission duration it becomes difficult to accommodate the URLLC communications, for example, where often the ability to transmit over a small number of symbols is preferred, ask well as the so-called orphan symbol issue discussed above. Due to this RRC configuration varied transmission is not always possible over very small number of symbols.

In URLLC, as one nominal transmission can be anywhere from 1 symbol to 14 symbols, the budgeted overhead may be too much for a short transmission. In one example, $N_{symb}^{sh}=2$, $N_{DMRS}^{PRB}=6$ (e.g., 6 REs for single symbol Configuration Type 1 DMRS), $N_{oh}^{PRB}=18$, then with 2 OFDM symbols for a PUSCH nominal transmission, then $N'_{RE} = N_{sc}^{RB} \cdot N_{symb}^{sh} - N_{DMRS}^{PRB} - N_{oh}^{PRB} = 12 \times 2 - 6 - 18 = 0$.

Thus, from a UE implementation point of view, where the number $N'_{RE}$ is technically zero or even negative, then the UE will not transmit anything over a given transmission.

Due to a nominal PUSCH being of a small duration, if the same practice of using a cell-common parameter (PUSCH-ServingCellConfig→xOverhead) for PUSCH transmissions can be adopted, then in many cases $N'_{RE}$ could be a negative number if the signal duration (L) is too small. The same modification alternatives on $N'_{RE}$ for PUSCH can be considered for PDSCH as described herein.

Figure 4:
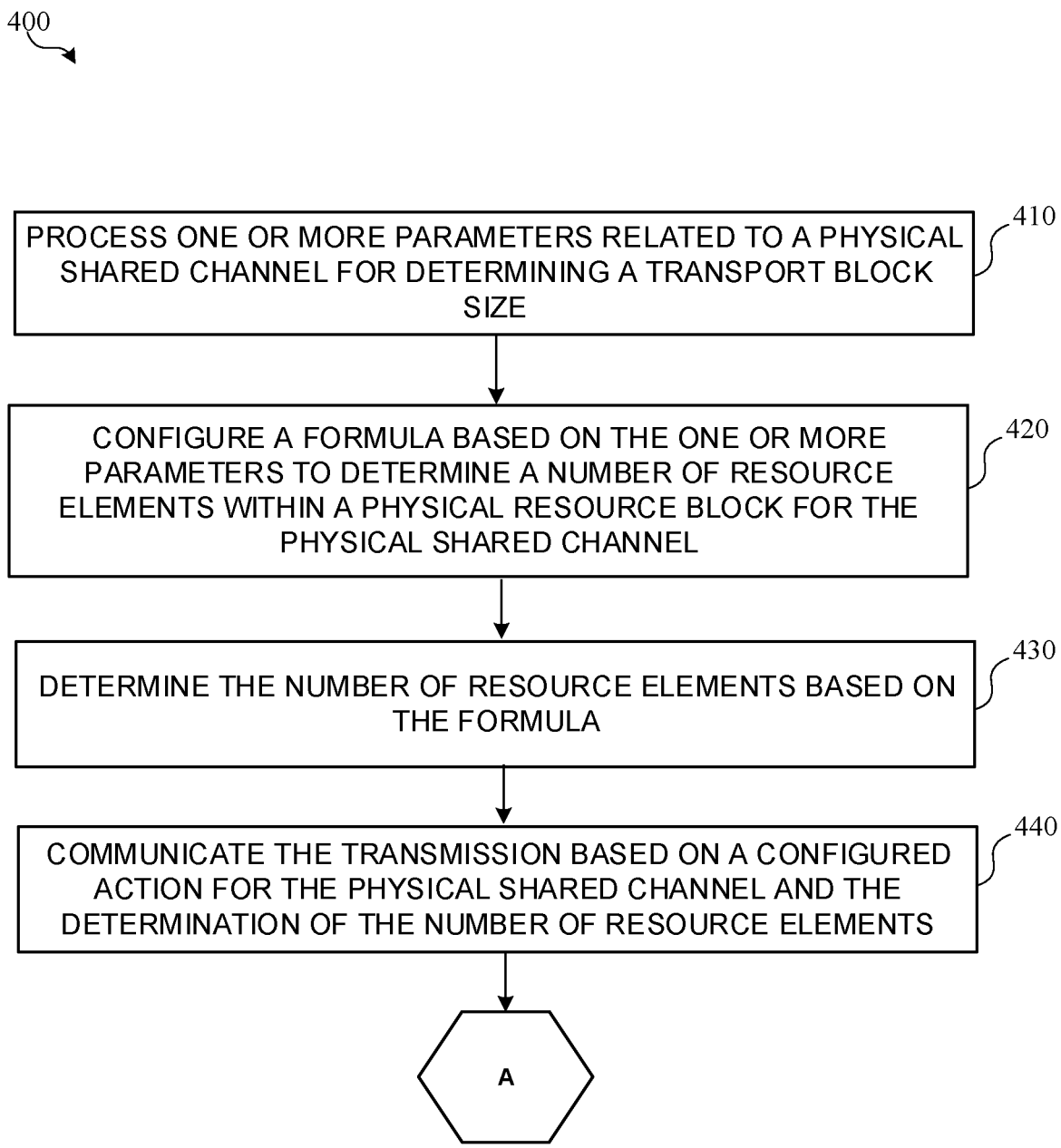
FIGS. 4-8 are flow diagrams of example process flows employable at a network device for communications according to various aspects described herein.

Referring to FIG. 4, illustrated is an example process flow for determining transport block sizes according to one or more configured actions for a network device (e.g., UE 101, gNB 110, or the like) in accord with determining TBS with embodiments herein.

At 410, the process flow can initiate with processing one or more parameters related to a physical shared channel for determining a transport block size. The one or more parameters can include, for example, at least one of: a number ($N_{sc}^{RB}$) of subcarriers in the frequency domain in a physical resource block, a number ($N_{symb}^{sh}$) of symbols of a physical shared channel allocation within a slot, an overhead parameter ($N_{oh}^{PRB}$) configured by a higher layer signaling based on a serving cell configuration of an information element to different signal durations of a PUSCH transmission or a PDSCH transmission as the physical shared channel, or a number ($N_{DMRS}^{PRB}$) of REs for demodulation reference signal (DMRS) per physical resource block (PRB) in an allocated duration including an overhead of the DM-RS code division multiplexing (CDM) groups without data.

At 420, the process flow 400 can further comprise configuring a formula based on the one or more parameters to determine a number of resource elements (REs) within a physical resource block (PRB) for the physical shared channel. At 430, the process flow further comprises determining the number $N'_{RE}$ of REs based on the formula with any one or more of the one or more parameters. For example, the formula can be as follows: $N'_{RE} = N_{sc}^{RB} \cdot N_{symb}^{sh} - N_{DMRS}^{PRB} - N_{oh}^{PRB}$ or a different formula in other embodiments. At 440, the process flow further includes communicating the transmission based on a configured action for the physical shared channel and the determination of the number of REs. Then at A, the process flow can continue with other embodiments.

Figure 5:
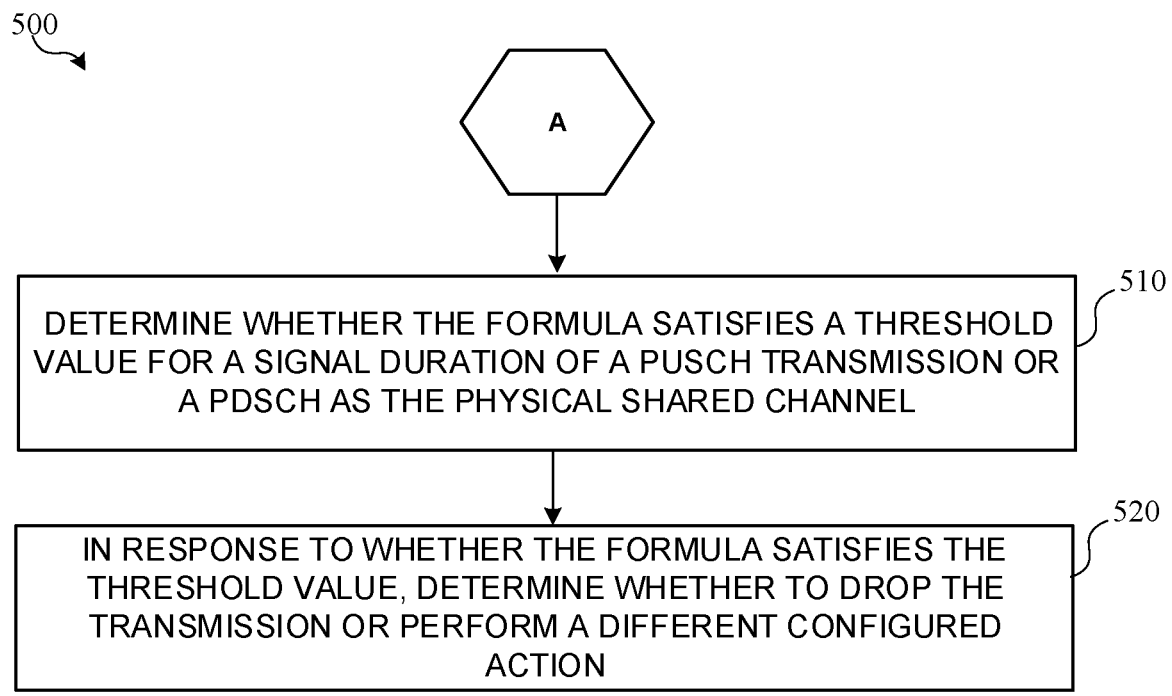

Referring to FIG. 5, illustrates a process flow 500 that can continue from process flow 400 or be independent of process flow 400 of FIG. 4 for determining TBS in a physical shared channel. For example, process flow 500 can initiate at 510 with determining whether the formula satisfies a threshold value for a signal duration of a PUSCH transmission or a PDSCH as the physical shared channel. At 520, the process flow 500 can include determining whether to drop the transmission or perform a different configured action in response to whether the formula satisfies the threshold value. Here, a different configured action can be to reformulate or modify the formula, determine different thresholds, or other aspects disclosed in this disclosure, for example.

In an embodiment, with $N'_{RE}=N_{sc}^{RB}\cdot N_{symb}^{sh}-N_{DMRS}^{PRB}-N_{oh}^{PRB}$, if $N'_{RE}$ is negative or zero, then the UE 101, 200, or 300 can perform a configured action. In this case, the configured action includes that the actual transmission being dropped (i.e., no PUSCH transmission). Here, the RRC configured overhead can be applied for transmissions of all durations. This can be implemented basically to avoid the UE continuing effort, and thus, the UE 101, 200, 300 can be signaled or preconfigured to say if the RE number count $N'_{RE}$ is negative or zero then the actual transmission is dropped and no transmission is performed. Thus, the configuration or any option of an information element is not changed.

Figure 6:
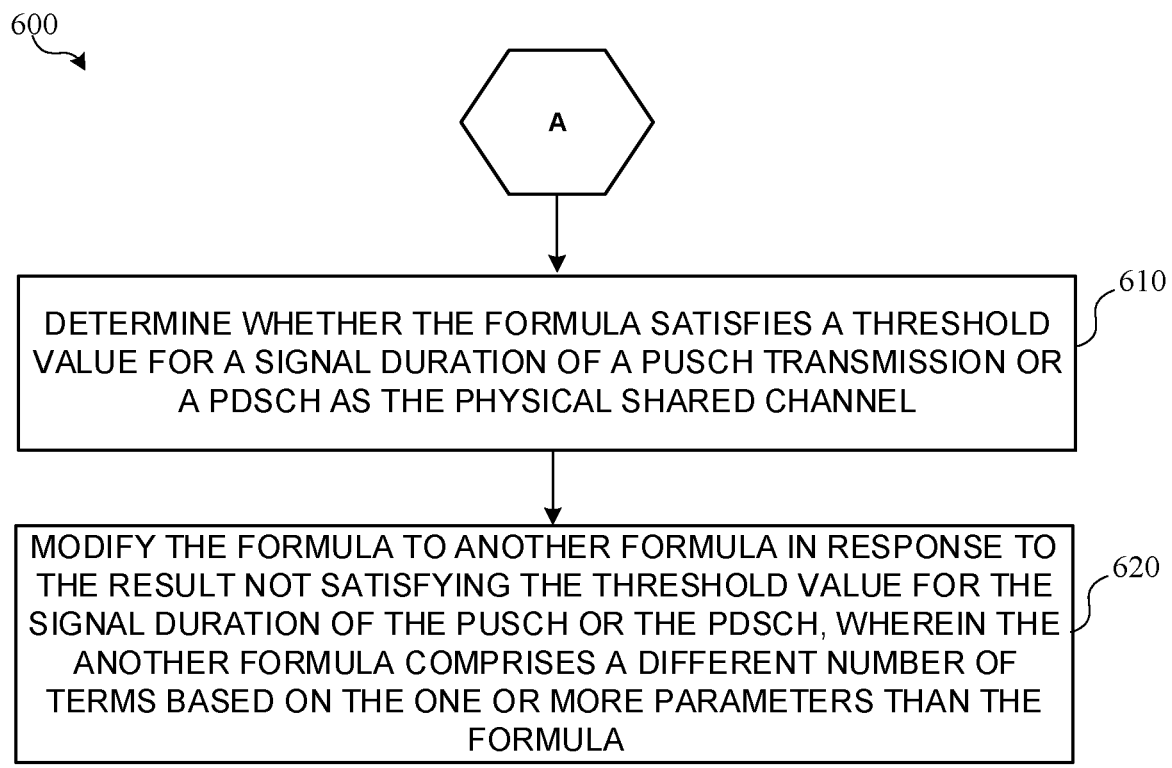

Referring to FIG. 6, illustrates a process flow 500 that can continue from process flow 400 of FIG. 4 or process flow 500 of FIG. 5, or be independent of process flow 400 or 500 for determining TBS in a physical shared channel. For example, process flow 600 can initiate at 610 with determining whether a formula satisfies a threshold, such as a number of REs being at zero or a negative value according to the formula, for example. At 620, process flow 600 can further include modifying the formula to another formula in response to the result not satisfying the threshold value for the signal duration of the PUSCH or the PDSCH, wherein the another or second formula can comprise a different number of terms based on the one or more parameters than the formula.

For example, the UE 101, 200, or 300 can compute the formula, with $N'_{RE}=N_{sc}^{RB}\cdot N_{symb}^{sh}-N_{DMRS}^{PRB}-N_{oh}^{PRB}$, and when $N'_{RE}$ is negative or zero, then a modified formula below is used to re-calculate $N'_{RE}$ as follows: $N'_{RE}=N_{sc}^{RB}\cdot N_{symb}^{sh}-N_{DMRS}^{PRB}-N_{oh}^{PRB}$. Here, when $N'_{RE}$ is negative or zero with the original formula, then the alternate formula is used to determine the $N'_{RE}$ for transmissions. This second modified/alternate formula can drop the overhead term that is configured from a higher layer parameter, for example. This could reduce transmission overhead for other transmissions such as for sounding reference signals (SRSs) and reduce the RRC overhead.

Figure 7:
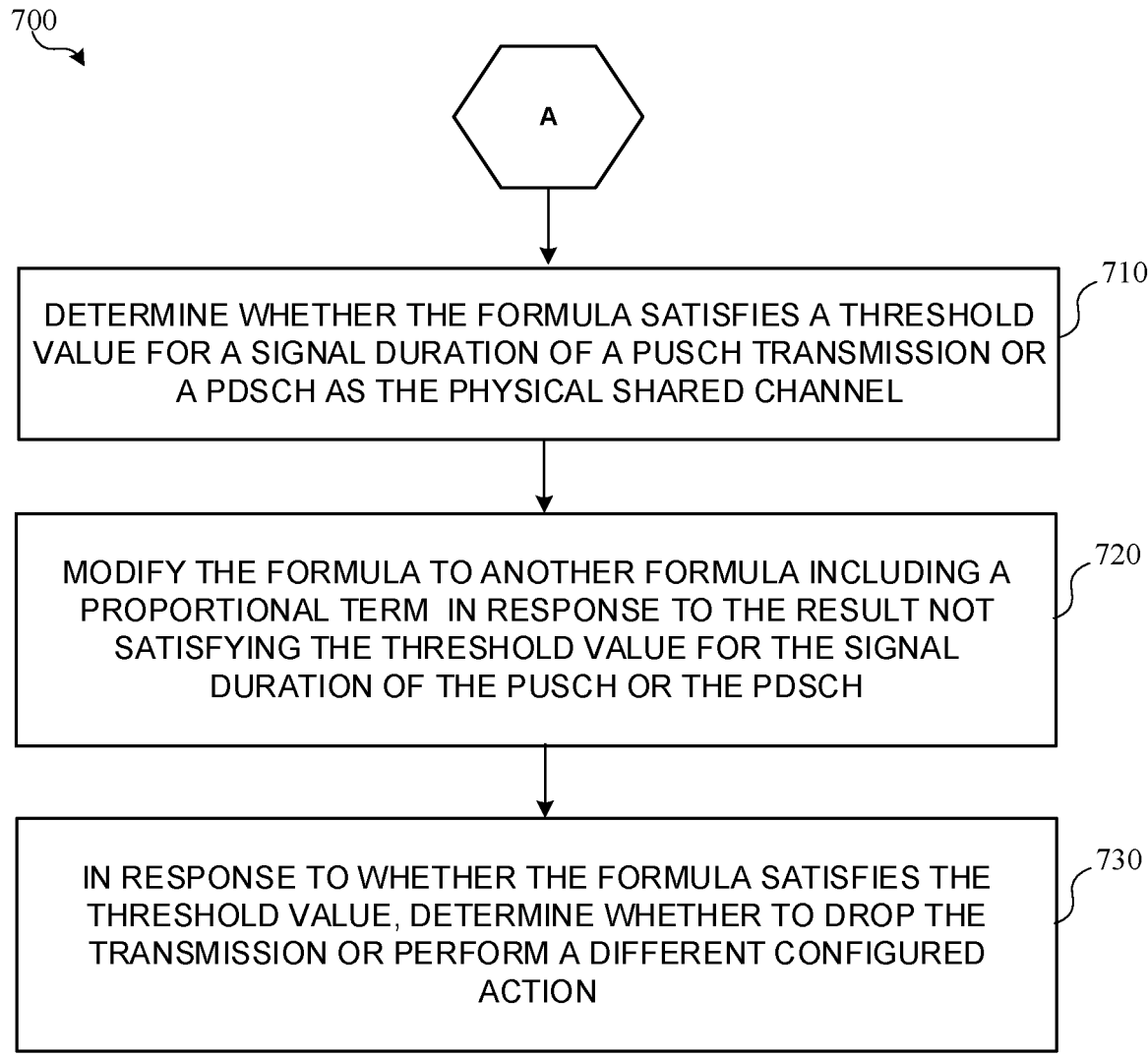

Referring to FIG. 7, illustrates a process flow 700 that can continue from process flow 400 of FIG. 4, process flow 500 of FIG. 5, or process flow 600 of FIG. 6, or be independent of process flow 400, 500, or 600 for determining TBS in a physical shared channel. For example, process flow 700 can initiate at 710 with determining whether a formula satisfies a threshold, such as a number of REs being at zero or a negative value according to the formula. At 720, the process flow 700 can further include modifying the formula to another formula with a proportional term in response to the result not satisfying the threshold value for the signal duration of the PUSCH or the PDSCH. Here, the first formula can be modified or replaced with a second formula having a proportional term that configures the number of REs ($N'_{RE}$) based on a proportion of an RRC configured overhead parameter ($N_{oh}^{PRB}$) to a nominal PUSCH duration or a nominal PDSCH duration of a nominal transmission.

At 730, the process flow 700 can include determining whether to drop the transmission or perform a different configured action in response to whether the formula satisfies the threshold value.

In an embodiment, the UE 101, 200, or 300 can use the modified formula below is used for $N'_{RE}$ for all cases:

$$N'_{RE} = N_{sc}^{RB} \cdot N_{symb}^{sh} - N_{DMRS}^{PRB} - \left\lfloor N_{oh}^{PRB} \cdot \frac{N_{symb}^{sh}}{14} \right\rfloor.$$

If $N'_{RE}$ is negative or zero, then the actual transmission is dropped (i.e. no PUSCH transmission); With this solution, the assumed overhead can be proportional to the nominal PUSCH duration. In particular, the proportional term can include $$\left\lfloor N_{oh}^{PRB} \cdot \frac{N_{symb}^{sh}}{14} \right\rfloor.$$

The proportional term thus comprises a number of symbols of a physical shared channel allocation within a slot of a nominal PDSCH or PUSCH transmission and the configured action comprises dropping the transmission via the physical shared channel.

Figure 8:
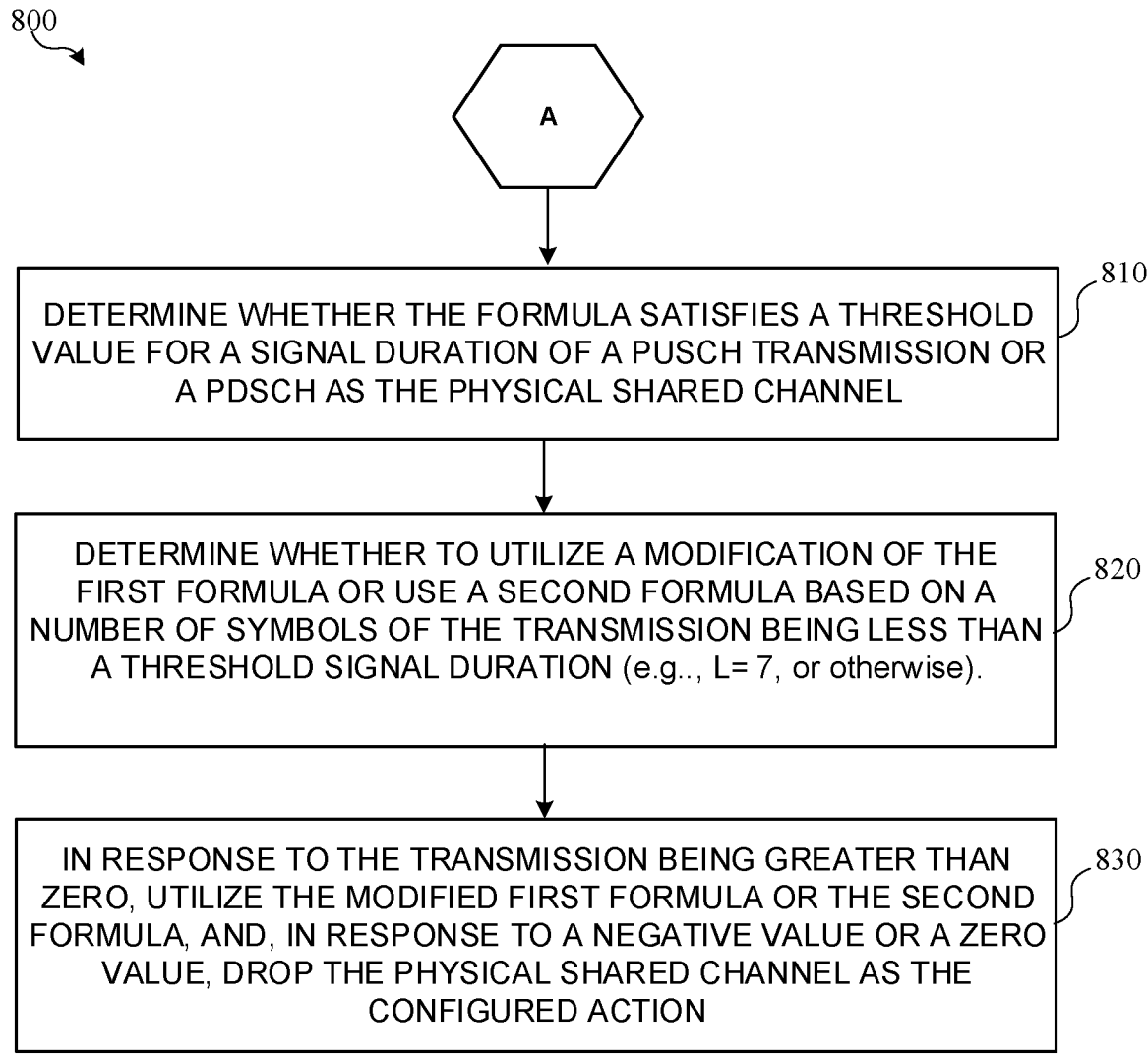

Referring to FIG. 8, illustrates a process flow 800 that can continue from process flow 400 thru 700 of FIGS. 4 to 7, or can be independent of process flow 400, 500, 600 or 700 for determining TBS in a physical shared channel. For example, process flow 800 can initiate at 810 with determining whether a formula satisfies a threshold, such as a number of REs being at zero or a negative value according to the formula. At 820, the process flow 800 further comprises determining whether to utilize a modification of the first formula or use a second formula based on a number of symbols of the transmission being less than a threshold signal duration (e.g., L=7, or otherwise). At 830, the process flow 800 can include in response to the modified first formula or the second formula being greater than zero, utilize the modified first formula or the second formula, and, in response to a negative value or a zero value, drop the physical shared channel as the configured action.

For example, if $N_{symb}^{sh}$ is less than a threshold (e.g. when L=7) the formula can be modified to be utilized as $$N'_{RE} = N_{sc}^{RB} \cdot N_{symb}^{sh} - N_{DMRS}^{PRB} - \left\lfloor N_{oh}^{PRB} \cdot \frac{N_{symb}^{sh}}{14} \right\rfloor,$$

or be $N'_{RE}=N_{sc}^{RB}\cdot N_{symb}^{sh}-N_{DMRS}^{PRB}$; otherwise the original formula as follows is used: $N'_{RE}=N_{sc}^{RB}\cdot N_{symb}^{sh}-N_{DMRS}^{PRB}-N_{oh}^{PRB}$. if $N'_{RE}$ is negative or zero, then the actual transmission is dropped (i.e. no PUSCH or PDSCH transmission).

Alternatively, or additionally, the UE 101, 200 or 300 can configure could $N_{oh}^{PRB}=0$, if $N_{symb}^{sh}$ is less than a threshold, or $N_{oh}^{PRB}=$xoverhead if $N_{symb}^{sh}$ is larger than a threshold. Here, the UE 101, 200 or 300 configures at least two different thresholds based on a number of symbols allocated by a PUSCH or a PDSCH. As such, different levels of values can then be determined for a configured overhead parameter based on the number of symbols allocated by the PUSCH or the PDSCH in relation to the at least two different thresholds.

Alternatively, the UE 101, 200 or 300 can configure multiple levels of $N_{oh}^{PRB}$ depending on $N_{symb}^{sh}$. For example, $N_{oh}^{PRB}=x_1$ if $N_{symb}^{sh}<$Thre1; $N_{oh}^{PRB}=x_2$ if Thre1$\leq N_{symb}^{sh}<$Thre2; $N_{oh}^{PRB}=$xoverhead if $N_{symb}^{sh}\geq$Thre2, where $x_1 \leq x_2 \leq$xoverhead. Thus, at least two different thresholds based on a number of symbols allocated by a PUSCH or a PDSCH, and different levels of values can be determined for a configured overhead parameter based on the number of symbols allocated by the PUSCH or the PDSCH in relation to the at least two different thresholds.

Any actual repetition under a nominal repetition herein with $N'_{RE} \le 0$ can be considered an orphan symbol transmission for actual transmission at one OFDM symbol, for example, and the UE drops that actual repetition.

Note one motivation of the proposed embodiments is to avoid zero TBS size for an allocation. In Rel-16, PDSCH Type B with 1, 2, 3, 4, . . . , 13 symbols can be supported. For TBS size determinization, the below formula can be used for PUSH $N'_{RE} = N_{sc}^{RB} \cdot N_{symb}^{sh} - N_{DMRS}^{PRB} - N_{oh}^{PRB}$. Further for DL, $N_{oh}^{PRB}$ is determined from xOverhead signaled within PDSCH-ServingCellConfig, and takes a value from {6, 12, 18}. The same modification alternatives on $N'_{RE}$ for PUSCH can be considered for PDSCH as discussed in embodiments herein.

In another embodiment, the number of PRB allocations is considered as another factor to determine which formula (i.e. between the original one in the TS 38.214 specification vs any of the proposed modifications here) is used. In one example, if the number of PRB allocations or the product of the number of PRB allocations and $N_{symb}^{sh}$ is lower than a threshold, the modification is adopted. In another example, if the number of PRB allocations or the product of the number of PRB allocations and $N_{symb}^{sh}$ is above a threshold, the modification is adopted.

FIG. 9 illustrates an example information element for PDSCH serving cell configuration. This can be signaled to the UE 101, 200 or 300 by gNB 111, 200 or 300, for example, in order to configure one or more of the parameters. For example, a configuration element of an IE can be as follows: PDSCH-ServingCellConfig::=SEQUENCE {codeBlockGroupTransmission SetupRelease {PDSCH-CodeBlockGroupTransmission} OPTIONAL, - - - Need M; xOverhead ENUMERATED {xOh6, xOh12, xOh18} OPTIONAL, - - - Need S; nrofHARQ-ProcessesForPDSCH ENUMERATED {n2, n4, n6, n10, n12, n16} OPTIONAL, - - - Need S pucch-Cell ServCellIndex OPTIONAL, - - - Cond SCellAddOnly . . . , [[maxMIMO-Layers INTEGER (1 . . . 8) OPTIONAL, - - - Need M processingType2Enabled BOOLEANOPTIONAL - - - Need M]]}

Appendix of TS 38.214 at 6.1.4.2 is proposed as follows: Transport block size determination is:

For a PUSCH scheduled by RAR UL grant or for a PUSCH scheduled by a DCI format 0_0 with CRC scrambled by C-RNTI, MCS-C-RNTI, TC-RNTI, CS-RNTI, or for a PUSCH scheduled by a DCI format 0_1 with CRC scrambled by C-RNTI, MCS-C-RNTI, CS-RNTI, SP-CSI-RNTI, or for a PUSCH transmission with configured grant; if $-0 \le I_{MCS} \le 27$ and transform precoding is disabled and Table 5.1.3.1-2 is used, or $-0 \le I_{MCS} \le 28$ and transform precoding is disabled and a table other than Table 5.1.3.1-2 is used, or $0 \le I_{MCS} \le 27$ and transform precoding is enabled, the UE shall first determine the TBS as specified as follows: the UE shall first determine the number of REs ($N_{RE}$) within the slot: a UE first determines the number of REs allocated for PUSCH within a PRB ($N'_{RE}$) by $N'_{RE} = N_{sc}^{RB} \cdot N_{symb}^{sh} - N_{DMRS}^{PRB} - N_{oh}^{PRB}$, where $N_{sc}^{RB} = 12$ is the number of subcarriers in the frequency domain in a physical resource block, $N_{symb}^{sh}$ is the number of symbols of the PUSCH allocation within the slot, $N_{DMRS}^{PRB}$ is the number of REs for DM-RS per PRB in the allocated duration including the overhead of the DM-RS CDM groups without data, as described for PUSCH with a configured grant in Subclause 6.1.2.3 or as indicated by DCI format 0_1 or as described for DCI format 0_0 in Subclause 6.2.2, and $N_{oh}^{PRB}$ is the overhead configured by higher layer parameter xOverhead in PUSCH-ServingCellConfig. If the $N_{oh}^{PRB}$ is not configured (a value from 6, 12, or 18), the $N_{oh}^{PRB}$ is assumed to be 0. For Msg3 transmission the $N_{oh}^{PRB}$ is always set to 0. A UE determines the total number of REs allocated for PUSCH ($N_{RE}$) by $N_{RE} = \min(156, N'_{RE}) \cdot n_{PRB}$ where $n_{PRB}$ is the total number of allocated PRBs for the UE. Next, the process proceeds with steps 2-4 as defined in Subclause 5.1.3.2

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a User Equipment (UE) comprising: one or more processors configured to: process one or more parameters related to a physical shared channel for determining a transport block size; generate a determination of a number of resource elements (REs) within a physical resource block (PRB) for the physical shared channel based on a first value that is derived from the one or more parameters; and generate a configured action for the physical shared channel based on the determination of the number of resource elements (REs); a radio frequency (RF) interface, configured to provide, to RF circuitry, data for transmission based on the configured action.

A second example can include the first example, wherein the one or more processors are further configured to: generate the determination by determining whether the first value indicates an integer value greater than a threshold value for a signal duration of a physical uplink shared channel (PUSCH) transmission or a physical downlink shared channel (PDSCH) transmission as the physical shared channel.

A third example can include the first or second example, wherein the one or more processors are further configured to: in response to the first value providing a negative value or a zero value, drop the physical shared channel as the configured action and apply a radio resource control (RRC) configured overhead parameter based on a serving cell configuration of an information element to different signal durations of a PUSCH transmission or a PDSCH transmission as the physical shared channel.

A fourth example can include any one or more of the first through third examples, wherein the one or more parameters comprises at least one of: a number ($N_{sc}^{RB}$) of subcarriers in a frequency domain in a physical resource block, a number ($N_{symb}^{sh}$) of symbols of a physical shared channel allocation within a slot, an overhead parameter ($N_{oh}^{PRB}$) configured by a higher layer signaling based on a serving cell configuration of an information element to different signal durations of a PUSCH transmission or a PDSCH transmission, and a number $N_{DMRS}^{PRB}$ for demodulation reference signal (DM-RS) per physical shared physical resource block (PRB) in an allocated duration including an overhead of the DM-RS code division multiplexing (CDM) groups without data.

A fifth example can include any one or more of the first through fourth examples, wherein the one or more processors are further configured to: modify a first formula to a second formula in response to the first value providing a negative or a zero from the first formula, wherein the second formula comprises a different number of one or more parameters than the first formula, the second formula represented as follows:

$$N'_{RE} = N_{sc}^{RB} \cdot N_{symb}^{sh} - N_{DMRS}^{PRB} - \left\lfloor N_{oh}^{PRB} \cdot \frac{N_{symb}^{sh}}{14} \right\rfloor, \text{ or}$$

$$N'_{RE} = N_{sc}^{RB} \cdot N_{symb}^{sh} - N_{DMRS}^{PRB};$$

and the first formula represented as follows: $N'_{RE} = N_{sc}^{RB} \cdot N_{symb}^{sh} - N_{DMRS}^{PRB} - N_{oh}^{PRB}$.

A sixth example can include any one or more of the first through fifth examples, wherein the first value derives from a first formula comprising a proportional term that configures a number of REs ($N'_{RE}$) based on a proportion of an RRC configured overhead parameter ($N_{oh}^{PRB}$) to a nominal PUSCH duration or a nominal PDSCH duration of a nominal transmission.

A seventh example can include any one or more of the first through sixth examples, wherein the proportional term further comprises a number of symbols of a physical shared channel allocation within a slot of the nominal transmission and the configured action comprises dropping the transmission via the physical shared channel, in response to the first formula indicating a negative value or a zero value, and modifying a signal duration for the transmission in response to the first formula indicating the number of REs being above zero and below a threshold signal duration.

An eighth example can include any one or more of the first through seventh examples, wherein the one or more processors are further configured to: modify the first formula to a second formula in response to the first formula providing a negative or a zero, wherein the second formula comprises a different number of one or more parameters than the first formula.

A ninth example can include any one or more of the first through eighth examples, wherein the one or more processors are further configured to: determine whether to utilize a modification of a first formula that provides the first value to a second formula providing a second value based on a number of symbols of the transmission being less than a threshold signal duration.

A tenth example can include any one or more of the first through ninth examples, wherein the one or more processors are further configured to: in response to the modified first formula or the second formula providing the second value being greater than zero, utilize the modified first formula or the second formula, and, in response to a negative value or a zero value, drop the physical shared channel as the configured action.

An eleventh example can include any one or more of the first through tenth examples, wherein the one or more processors are further configured to: process the one or more parameters comprising a configured overhead parameter, wherein the configured overhead parameter is zero in response to a number of symbols allocated by PUSCH or PDSCH being less than a threshold number, or the configured overhead parameter is equal to an overhead parameter of a serving cell configuration of an information element from a PUSCH or a PDSCH.

A twelfth example can include any one or more of the first through eleventh examples, wherein the one or more processors are further configured to: configure at least two different thresholds based on a number of symbols allocated by a PUSCH or a PDSCH; and determining different levels of values for a configured overhead parameter based on the number of symbols allocated by the PUSCH or the PDSCH in relation to the at least two different thresholds.

A thirteenth example is a tangible computer readable storage device storing executable instructions that, in response to execution, cause one or more processors of User Equipment (UE) for a transmission to perform operations, the operations comprising: processing one or more parameters related to a physical shared channel for determining a transport block size (TBS); configuring a formula based on the one or more parameters to determine a number of resource elements (REs) within a physical resource block (PRB) for the physical shared channel; determining the number of REs based on the formula; and communicating the transmission based on a configured action for the physical shared channel and the determination of the number of REs.

A fourteenth example includes the thirteenth example, wherein the operations further comprise: determining whether the formula satisfies a threshold value for a signal duration of a physical uplink shared channel (PUSCH) transmission or a physical downlink shared channel (PDSCH) as the physical shared channel; and in response to whether the formula satisfies the threshold value, determining whether to drop the transmission or perform a different configured action.

A fifteenth example can include any one or more of the thirteenth through the fourteenth examples, wherein the operations further comprise: modifying the formula to another formula in response to not satisfying the threshold value for the signal duration of the PUSCH or the PDSCH, wherein the another formula comprises a different number of terms based on the one or more parameters than the formula.

A sixteenth example can include any one or more of the thirteenth through the fifteenth examples, wherein the operations further comprise: determining whether to utilize a modification of the formula or an another formula based on a number of symbols of the transmission being less than a threshold signal duration, wherein the formula or the another formula comprises a proportional term that configures the number of REs based on a proportion of an RRC configured overhead parameter to a nominal PUSCH duration or PDSCH duration; and determining the TBS based on the number of resource elements (REs) available.

A seventeenth is an apparatus configured to be employed at a network device comprising a user equipment (UE) or next generation NodeB (gNB) comprising: one or more processors configured to: determine a number of resource elements (REs) within a physical resource block (PRB) for a physical shared channel based on a first value derived from one or more parameters; and determine a configured action for the physical shared channel based on the number of resource elements (REs); a radio frequency (RF) interface, configured to provide, to RF circuitry, data for transmitting a communication based on the configured action.

An eighteenth example can include the seventeenth example, wherein the one or more parameters comprises at least one of: a number ($N_{sc}^{RB}$) of subcarriers in a frequency domain in a physical resource block, a number ($N_{symb}^{sh}$) of symbols of a physical shared channel allocation within a slot, an overhead parameter ($N_{oh}^{PRB}$) configured by a higher layer signaling based on a serving cell configuration of an information element to different signal durations of a PUSCH transmission or a PDSCH transmission, and a number $N_{DMRS}^{PRB}$ for demodulation reference signal (DM-RS) per physical shared physical resource block (PRB) in an allocated duration including an overhead of the DM-RS code division multiplexing (CDM) groups without data.

A nineteenth example can include any one or more of the seventeenth through the eighteenth examples, wherein the one or more processors are further configured to: modify a first formula that provides the first value to a second formula in response to the first formula providing a negative or a zero as the first value, wherein the second formula comprises a different number of the one or more parameters than the first formula.

A twentieth example can include any one or more of the seventeenth through the nineteenth examples, wherein the second formula comprises a proportional term that configures the number of REs based on a proportion comprising an RRC configured overhead parameter to a nominal PUSCH duration and a number of symbols of a physical shared channel allocation within a slot.

A twenty-first example can include any one or more of the seventeenth through the twentieth examples, wherein the one or more processors are further configured to: dropping a PUSCH transmission in response to the first formula indicating a negative value or a zero value, and modifying a signal duration based on the number of REs for a URLLC communication otherwise.

A twenty-second example can include any one or more of the seventeenth through the twentieth examples, wherein the one or more processors are further configured to: processing the one or more parameters comprising a configured overhead parameter, wherein the configured overhead parameter is zero in response to a number of symbols allocated by PUSCH being less than a threshold number, or the configured overhead parameter is equal to an overhead parameter of a serving cell configuration of an information element from a PUSCH.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a User Equipment (UE) comprising:
one or more processors configured to:
process one or more parameters related to a physical shared channel for determining a transport block size;
determine a number of resource elements (REs) within a physical resource block (PRB) for the physical shared channel based on whether a first value that is derived from the one or more parameters indicates an integer value greater than a threshold value for a signal duration of the physical shared channel; and
generate a configured action for the physical shared channel based on the determination of the number of resource elements (REs); and
a radio frequency (RF) interface, configured to provide, to RF circuitry, data for a transmission based on the configured action.

2. The apparatus of claim 1, wherein the one or more processors are further configured to:
in response to the first value providing a negative value or a zero value, drop the physical shared channel as the configured action and apply a radio resource control (RRC) configured overhead parameter based on a serving cell configuration of an information element to different signal durations of a physical uplink shared channel (PUSCH) transmission or a physical downlink shared channel (PDSCH) transmission as the physical shared channel.

3. The apparatus of claim 1, wherein the one or more parameters comprises at least one of: a number ($N_{sc}^{RB}$) of subcarriers in a frequency domain in a physical resource block, a number ($N_{symb}^{sh}$) of symbols of a physical shared channel allocation within a slot, an overhead parameter ($N_{oh}^{PRB}$) configured by a higher layer signaling based on a serving cell configuration of an information element to different signal durations of a PUSCH transmission or a PDSCH transmission, and a number $N_{DMRS}^{PRB}$ for demodulation reference signal (DM-RS) per physical shared physical resource block (PRB) in an allocated duration including an overhead of DM-RS code division multiplexing (CDM) groups without data; and
wherein the one or more processors are further configured to modify a first formula to a second formula in response to the first value providing a negative or a zero from the first formula, wherein the second formula comprises a different number of one or more parameters than the first formula, the second formula represented as follows:

$$N'_{RE} = N_{sc}^{RB} \cdot N_{symb}^{sh} - N_{DMRS}^{PRB} - \left\lfloor N_{oh}^{PRB} \cdot \frac{N_{symb}^{sh}}{14} \right\rfloor, \text{ or}$$

$$N'_{RE} = N_{sc}^{RB} \cdot N_{symb}^{sh} - N_{DMRS}^{PRB};$$

and the first formula represented as follows: $N_{RE}' = N_{sc}^{RB} \cdot N_{symb}^{sh} - N_{DMRS}^{PRB} - N_{oh}^{PRB}$.

4. The apparatus of claim 1, wherein the first value derives from a first formula comprising a proportional term that configures a number of REs $N_{RE}'$ based on a proportion of an RRC configured overhead parameter $N_{oh}^{PRB}$ to a nominal PUSCH duration or a nominal PDSCH duration of a nominal transmission.

5. The apparatus of claim 4, wherein the proportional term further comprises a number of symbols of a physical shared channel allocation within a slot of the nominal transmission and the configured action comprises dropping the transmission via the physical shared channel, in response to the first formula indicating a negative value or a zero value, and modifying a signal duration for the transmission in response to the first formula indicating the number of REs being above zero and below a threshold signal duration.

6. The apparatus of claim 4, wherein the one or more processors are further configured to:
modify the first formula to a second formula in response to the first formula providing a negative or a zero, wherein the second formula comprises a different number of one or more parameters than the first formula.

7. The apparatus of claim 1, wherein the one or more processors are further configured to:
determine whether to utilize a modification of a first formula that provides the first value to a second formula providing a second value based on a number of symbols of the transmission being less than a threshold signal duration; and
in response to the first formula or the second formula being modified providing the second value greater than zero, utilize the first formula or the second formula as modified, and, in response to a negative value or a zero value, drop the physical shared channel as the configured action.

8. The apparatus of claim 1, wherein the one or more processors are further configured to:
process the one or more parameters comprising a configured overhead parameter, wherein the configured overhead parameter is zero in response to a number of symbols allocated by PUSCH or PDSCH being less than a threshold number, or the configured overhead parameter is equal to an overhead parameter of a serving cell configuration of an information element from a PUSCH or a PDSCH.

9. The apparatus of claim 1, wherein the one or more processors are further configured to:
configure at least two different thresholds based on a number of symbols allocated by a PUSCH or a PDSCH; and
determining different levels of values for a configured overhead parameter based on the number of symbols allocated by the PUSCH or the PDSCH in relation to the at least two different thresholds.

10. A tangible computer readable storage device storing executable instructions that, in response to execution, cause one or more processors of User Equipment (UE) for a transmission to perform operations, the operations comprising:
processing one or more parameters related to a physical shared channel for determining a transport block size (TBS);
configuring a formula based on the one or more parameters to determine a number of resource elements (REs) within a physical resource block (PRB) for the physical shared channel;
determining the number of REs based on whether the formula satisfies a threshold value for a signal duration of the physical shared channel; and
communicating the transmission based on a configured action for the physical shared channel and the determination of the number of REs.

11. The tangible computer readable storage device of claim 10, wherein the operations further comprise:
in response to whether the formula satisfies the threshold value, determining whether to drop the transmission or perform a different configured action.

12. The tangible computer readable storage device of claim 11, wherein the operations further comprise:
modifying the formula to another formula in response to not satisfying the threshold value for the signal duration of a physical uplink shared channel (PUSCH) or a physical downlink shared channel (PDSCH), wherein the another formula comprises a different number of terms based on the one or more parameters than the formula.

13. The tangible computer readable storage device of claim 10, wherein the operations further comprise:
determining whether to utilize a modification of the formula or an another formula based on a number of symbols of the transmission being less than a threshold signal duration, wherein the formula or the another formula comprises a proportional term that configures the number of REs based on a proportion of an RRC configured overhead parameter to a nominal PUSCH duration or PDSCH duration; and
determining the TBS based on the number of resource elements (REs) available.

14. A baseband processor of a network device comprising a user equipment (UE) or next generation NodeB (gNB) configured to:
determine a number of resource elements (REs) within a physical resource block (PRB) for a physical shared channel based on a first value derived from one or more parameters;
determine a configured action for the physical shared channel based on the number of REs and whether the first value indicates an integer value greater than a threshold value for a signal duration of the physical shared channel; and
provide, to RF circuitry, data for transmitting a communication based on the configured action.

15. The baseband processor of claim 14, wherein the one or more parameters comprises at least one of: a number ($N_{sc}^{RB}$) of subcarriers in a frequency domain in a physical resource block, a number ($N_{symb}^{sh}$) of symbols of a physical shared channel allocation within a slot, an overhead parameter ($N_{oh}^{PRB}$) configured by a higher layer signaling based on a serving cell configuration of an information element to different signal durations of a PUSCH transmission or a PDSCH transmission, and a number $N_{DMRS}^{PRB}$ for demodulation reference signal (DM-RS) per physical shared physical resource block (PRB) in an allocated duration including an overhead of DM-RS code division multiplexing (CDM) groups without data.

16. The baseband processor of claim 14, further configured to:
modify a first formula that provides the first value to a second formula in response to the first formula providing a negative or a zero as the first value, wherein the second formula comprises a different number of the one or more parameters than the first formula.

17. The baseband processor of claim 16, wherein the second formula comprises a proportional term that configures the number of REs based on a proportion comprising an RRC configured overhead parameter to a nominal PUSCH duration and a number of symbols of a physical shared channel allocation within a slot.

18. The baseband processor of claim 16, further configured to:
dropping a physical uplink shared channel (PUSCH) transmission in response to the first formula indicating a negative value or a zero value, and modifying a signal duration based on the number of REs for a ultra-reliable low latency communication (URLLC) communication otherwise.

19. The baseband processor of claim 14, further configured to:
process the one or more parameters comprising a configured overhead parameter, wherein the configured overhead parameter is zero in response to a number of symbols allocated by PUSCH being less than a threshold number, or the configured overhead parameter is equal to an overhead parameter of a serving cell configuration of an information element from a PUSCH.

* * * * *